G. H. BERWICK.
CARVING DISH.
APPLICATION FILED DEC. 6, 1918.
1,365,147. Patented Jan. 11, 1921.
2 SHEETS—SHEET 1.
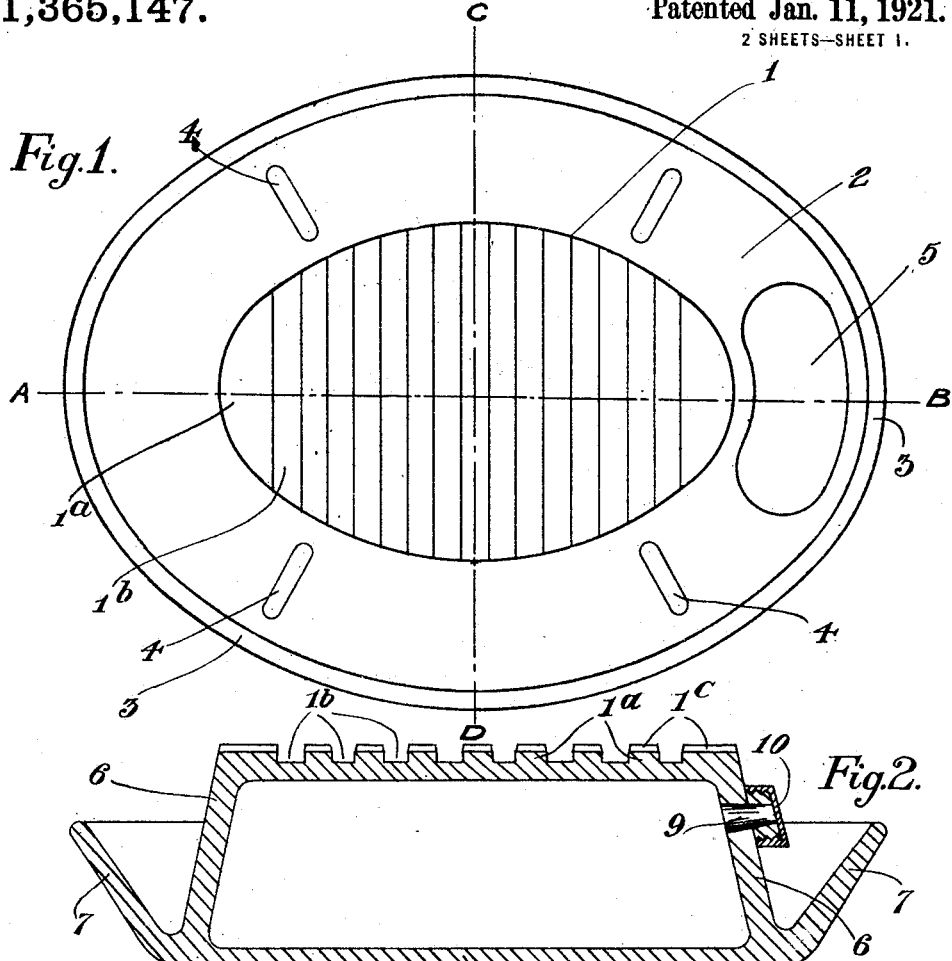
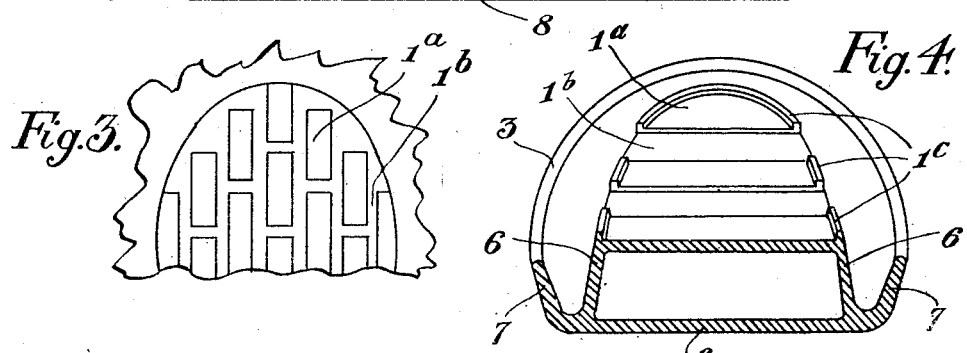
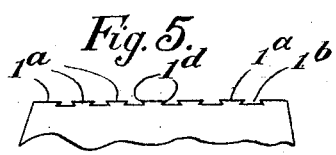
INVENTOR.
GEORGE HENRY BERWICK.
PER: Rayner & Co
ATTORNEYS.

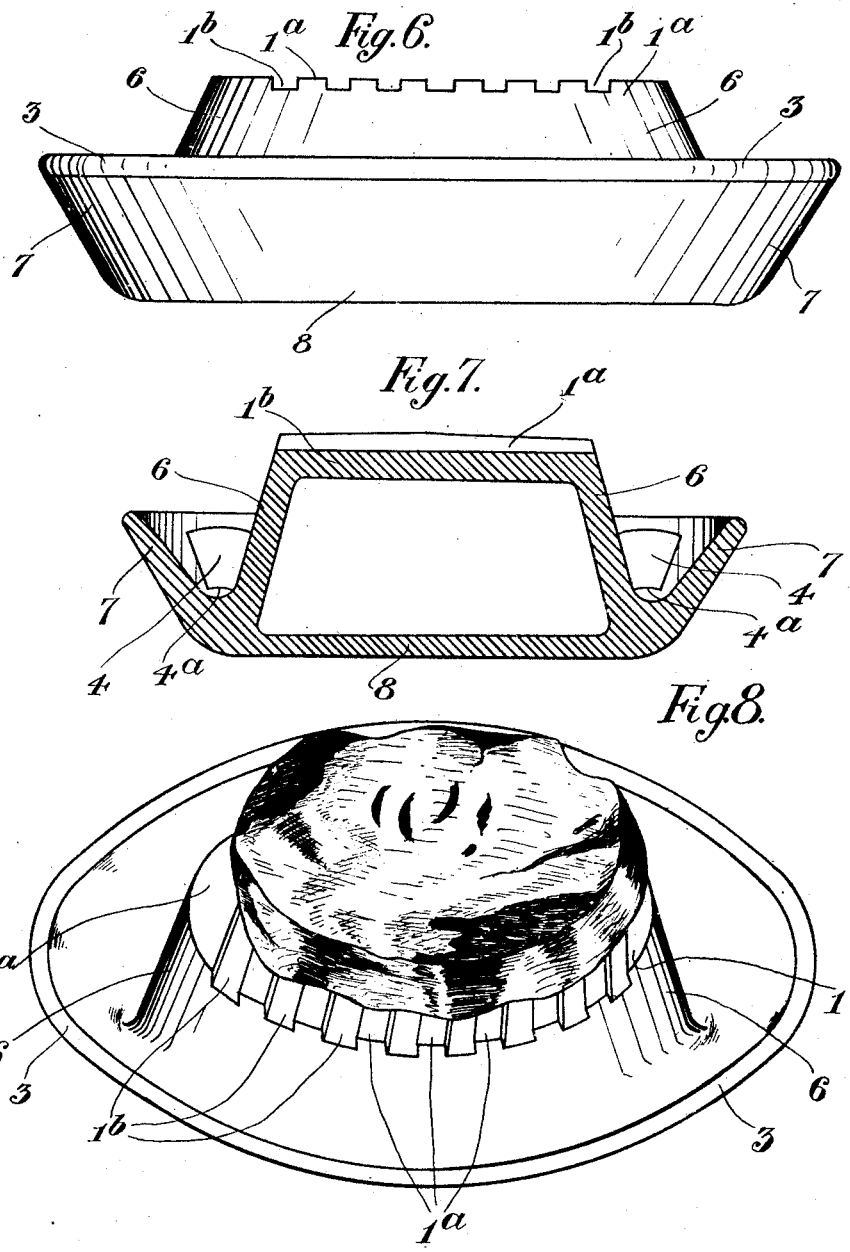

UNITED STATES PATENT OFFICE.

GEORGE HENRY BERWICK, OF HAMPSTEAD, LONDON, ENGLAND.

CARVING-DISH.

1,365,147. Specification of Letters Patent. Patented Jan. 11, 1921.

Application filed December 6, 1918. Serial No. 265,654.

*To all whom it may concern:*

Be it known that I, GEORGE HENRY BERWICK, subject of the King of Great Britain and Ireland, residing at 10 and 12 Adelaide road, Hampstead, in the county of London, England, have invented certain new and useful Improvements in Carving-Dishes, of which the following is a specification.

My invention relates to improvements in dishes upon which viands of every description may be carved, and the object of my invention is to provide a dish that will greatly assist and simplify the carving of various joints and pieces of meat, fish or fowl, especially those pieces or joints which are usually carved with the knife in an approximately horizontal direction such as rolled ribs of beef, tongues, cold bacon and the like, when these joints can be held steadily while being carved owing to the special and particular construction of my improved dish as hereinafter described.

In carrying out my invention, an important and characteristic feature of my invention consists in raising to a considerable degree the platform upon which the viands rest while they are being carved above the level of the base of the dish, and in providing this platform with sloping sides terminating in a continuous deep channel or canal running all around the platform with again raised sides so as to form the surrounding canal or channel for holding the gravy which will run from the meat being carved upon the upper platform.

The platform before referred to is traversed with horizontal ridges having narrow grooves in between acting as conduits from about the center of the platform to its edges which conduct the juices from the meats down to the surrounding canal. These ridges referred to are preferably formed with a reasonably sharp edge or arris which will tend to hold the meat being carved when pressed against them, and each or any ridge may be provided at the end (near the edges of the platform) with slight projections, to further assist against the possibility of the joint or other meat passing over the edge. The edges of these ridges may if desired be slightly undercut, and also the ridges instead of being continuous across the platform of the dish may be broken and one set of ridges so discontinued as to break joint with the adjacent ridge, thereby giving additional biting surface for the joint to bear upon. Although I prefer to make these ridges and grooves straight on plan, they may be made curvilinear if desired.

The under side of my improved carving dish may be formed hollow in the space underneath the platform, which when the dish is placed upon the table in the ordinary way will necessarily have the air confined to a great extent within this underneath portion which will receive some heat from the joint above, and consequently the platform upon which the joint is carved will remain in a better heated condition than if it was close down upon the table, as there will be a cushion of hot air below the carving platform. It will, however, be readily understood that the space beneath the carving platform may be inclosed at the bottom, thus forming a well into which hot water may be poured, and so the carving dish will be maintained hot from below while the joints are being carved thereon.

The canal or channel surrounding the carving platform may be slightly sloped horizontally toward a special recess or trough for receiving the gravy if so desired, and this surrounding canal or channel may be divided up by partitions extending to the bottom of the canal so that entirely separate compartments may be arranged to receive various kinds of vegetables or sauces or other condiments, or openings may be made at the bottom of these partitions enabling liquid to flow from one to another. An aperture through which hot water may be supplied and emptied may be provided to the compartment under the carving platform when such a compartment is arranged, and in this case the aperture is made and fitted with a washer and screwed cap; and it is to be understood that my improved dish may be made either in earthenware or in metal or part eathenware and part metal and its general construction and outline so designed as to be readily washed and kept in hygienic condition.

In order that my invention may be more fully understood, reference is had to the accompanying drawings wherein like numerals of reference refer to like parts throughout as far as possible, and I do not restrict myself to materials or exact sizes, the drawings being of a schematic nature.

Figure 1 (on Sheet 1) is a plan looking down upon my improved carving dish and

Fig. 2 a longitudinal section taken along the line A—B, in which my improved dish is provided with a floor forming with the other portion a well containing hot water.

Fig. 3 shows a modification of the arrangement of the ridges traveling across the carving platform and Fig. 4 is a sketch showing a modification embodying vertical projecting edges to the ridges on the platform.

Fig. 5 is a modification of the section of the ridges showing their sides slightly undercut.

Fig. 6 (on Sheet 2) is a side elevation of my improved dish showing the outside of the canal and the side of the carving platform above.

Fig. 7 is a transverse section of my improved dish taken on line C—D with an open space under the platform and a section of the platform shows the crossing ridges in elevation, and the conduits in section these sloping slightly from the center to the outside of the platform.

Fig. 8 is a perspective view of my improved carving dish with a joint placed upon the platform ready for carving, and here the crossing ridges are shown without the terminal projections with which the dish may be formed if required, and the divisions to the channel or canal are also eliminated, as this figure is meant to show my improved carving dish in its simplest form.

In Fig. 1 (plan of my improved dish) 1 is the platform upon which the meat is carved having sloping sides, 2 the canal or channel surrounding the platform, and 3 the upper outside edges of the dish forming the canal. $1^a$ indicates the traversing ridges and $1^b$ the conduit or passage between the ridges, which preferably slopes from the center to each side, and $1^c$ shows the slight vertical projections at the end of the ridges when it is desired to use such projections.

The divisions in the canal 2 are marked 4 and these divisions may be continuous to the bottom or have small openings in the same for the passage of any liquid if desired and it is clearly to be understood that my improved dish may also be made without these divisions.

5 indicates a trough or depression into which the gravy is conducted either through the canal surrounding the platform or by the converging of the conduits upon the platform.

In Fig. 2 the like numerals of reference apply as to those in Fig. 1, the sloping sides to the platform being marked 6 and the sloping outer sides of the dish forming the canal or channel is marked 7. According to this figure my dish is provided with a floor 8 forming the bottom and the well under the platform which is arranged to receive hot water, and the well so formed is provided with an aperture 9 for pouring in and discharging the hot water and to this aperture is provided a screw cap 10 preferably with a rubber washer to secure a good joint. The divisions to the canal 4 are in Fig. 7 shown with a small opening at the bottom $4^a$.

Figs. 3 and 4 are again marked with like numerals of reference as to the foregoing figures, as also is Fig. 5, but here the undercut sides of the ridges are marked $1^d$.

The purpose of undercutting the ridges is primarily to provide the platform with a surface which is better able to retain the meat than is the case with ridges of rectangular section. By undercutting, the ridges are provided with relatively sharp edges adapted to grip the meat. Further this construction renders the channels less likely to be blocked by the meat as the latter does not completely fill the cross-section of the channels when resting thereon.

What I claim as my invention and desire to obtain by Letters Patent is:—

1. A carving dish comprising a platform in the surface of which are formed a plurality of parallel channels having undercut sides extending to the edges of said platform, and a channel surrounding said platform and at a lower level than said platform.

2. A carving dish comprising a platform in the surface of which are formed a plurality of parallel channels having undercut sides extending to the edges of said platform, and a channel surrounding said platform and at a lower level than said platform, said channels in said platform being inclined downwardly toward the edges of said platform, the channel surrounding said platform being divided by transverse perforated partitions.

GEORGE HENRY BERWICK.